Jan. 25, 1944.    A. CALLESON ET AL    2,339,763
CONTAINER AND METHOD OF MAKING SAME
Filed March 21, 1941    7 Sheets-Sheet 1
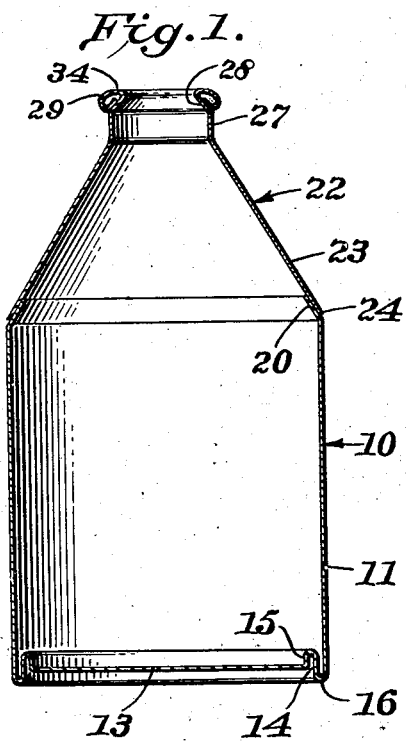
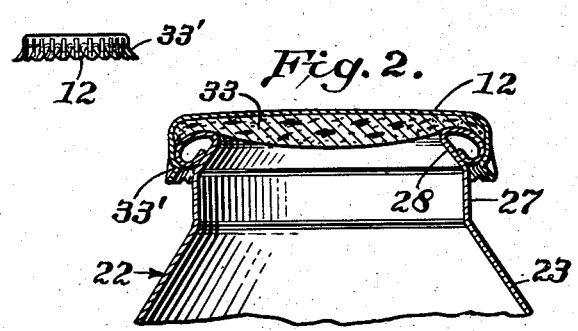
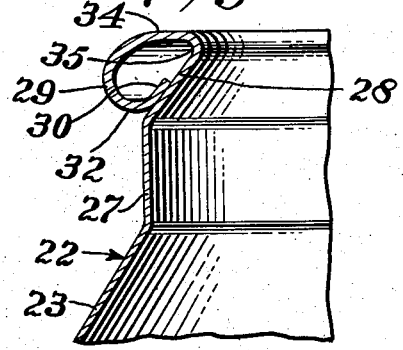
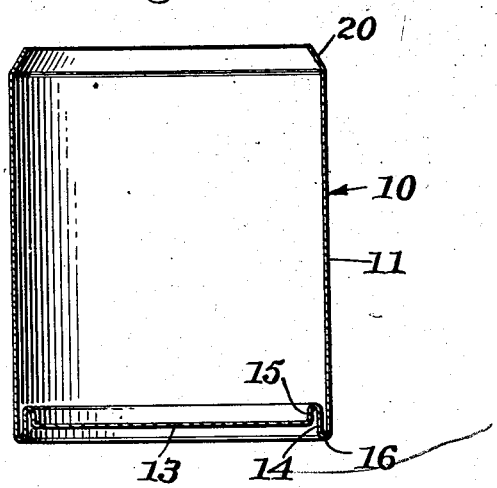
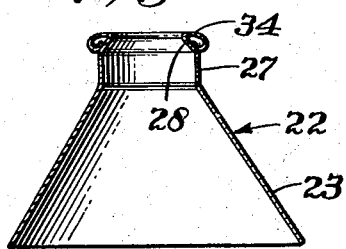
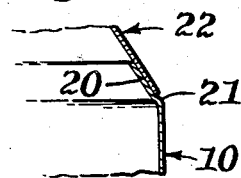
Inventors:
Amos Calleson,
Edgar H. Calleson,
By Cushman Darby and Cushman
Attorneys.

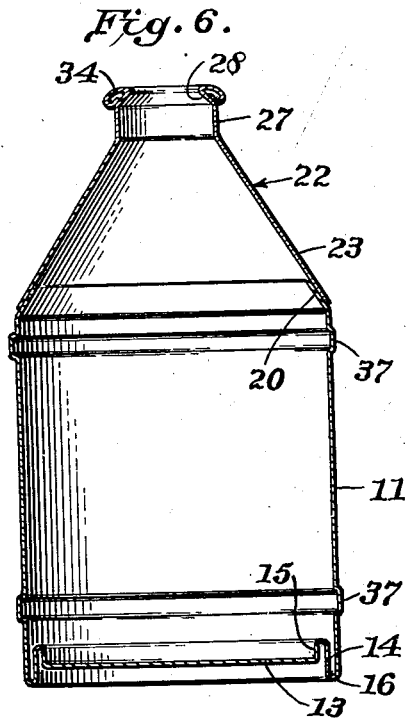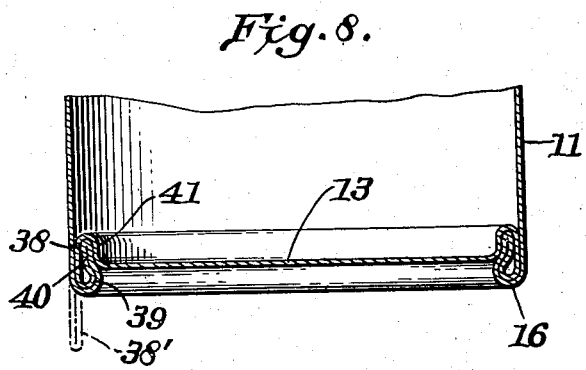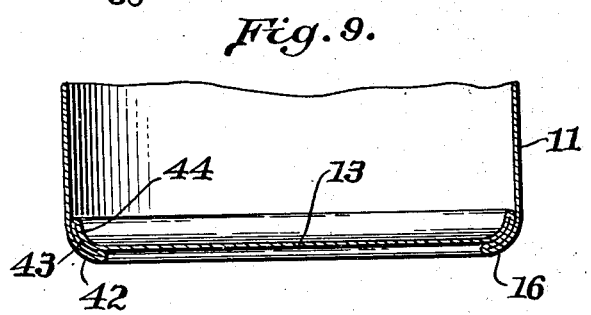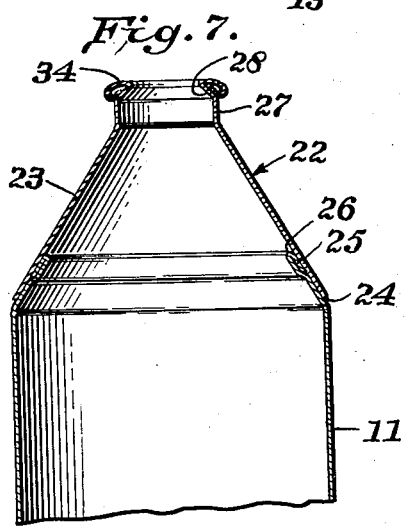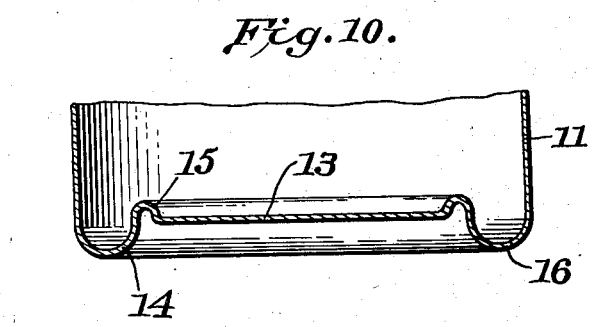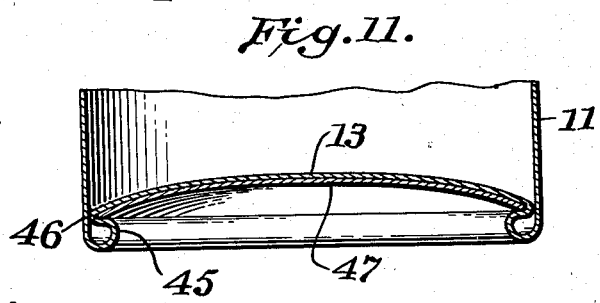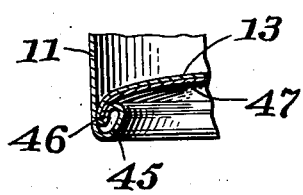

Jan. 25, 1944.    A. CALLESON ET AL    2,339,763
CONTAINER AND METHOD OF MAKING SAME
Filed March 21, 1941    7 Sheets-Sheet 3

Inventors:
Amos Calleson,
Edgar H. Calleson,
By Cushman Darby and Cushman
Attorneys.

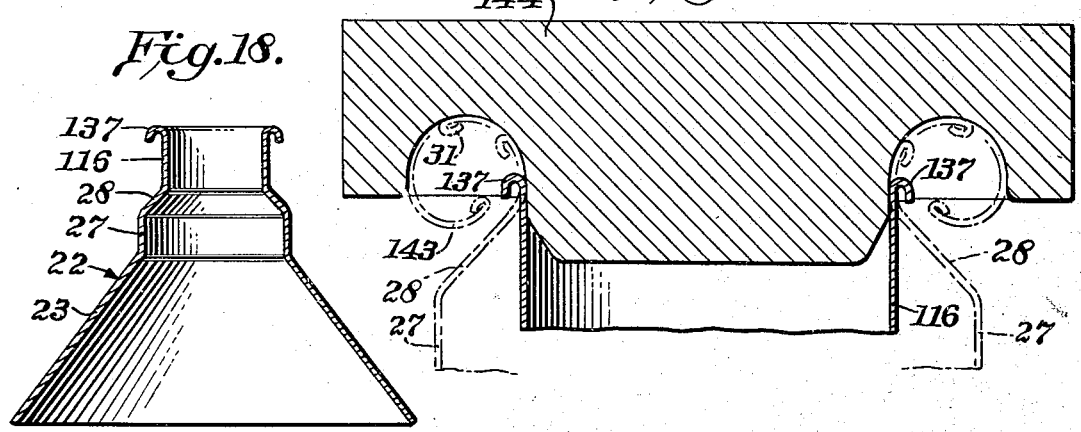
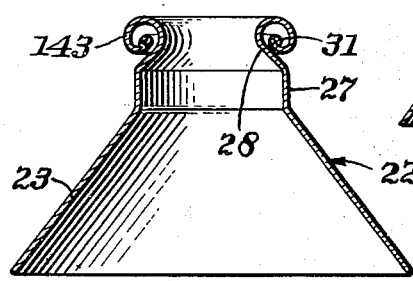
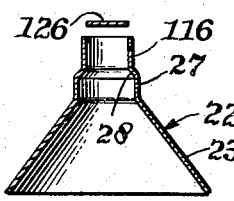
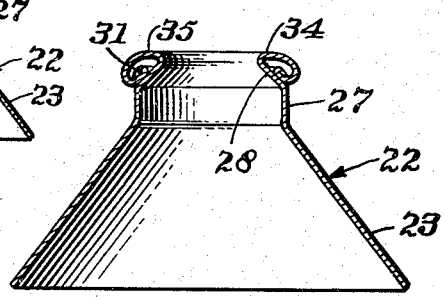
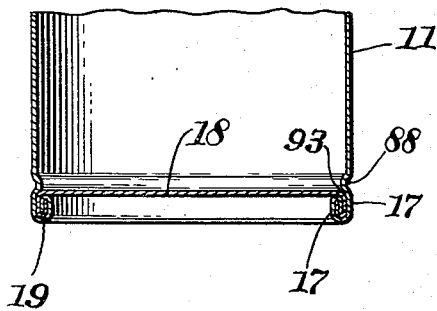
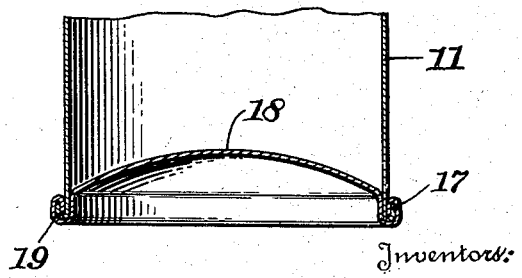

Jan. 25, 1944.  A. CALLESON ET AL  2,339,763
CONTAINER AND METHOD OF MAKING SAME
Filed March 21, 1941  7 Sheets-Sheet 5

1st REDRAW

2nd REDRAW

3rd REDRAW

4th REDRAW

5th REDRAW

Inventors:
Amos Calleson,
Edgar A. Calleson,
By Cushman Darby and Cushman
Attorneys.

Jan. 25, 1944.    A. CALLESON ET AL    2,339,763
CONTAINER AND METHOD OF MAKING SAME
Filed March 21, 1941    7 Sheets-Sheet 6

Inventors:
Amos Calleson,
Edgar H. Calleson,
By Cushman Darby and Cushman
Attorneys.

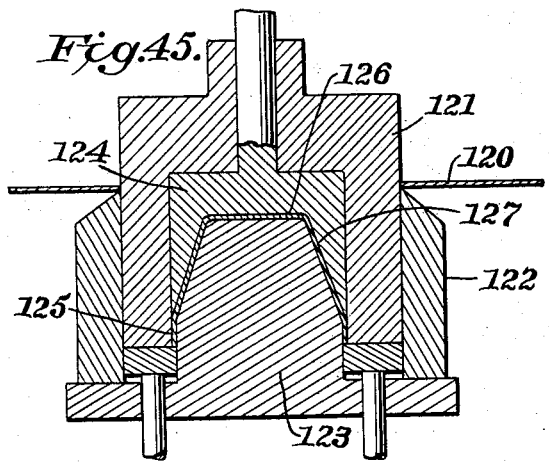
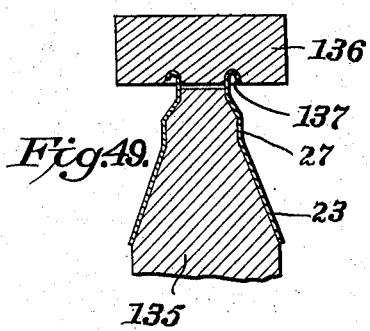
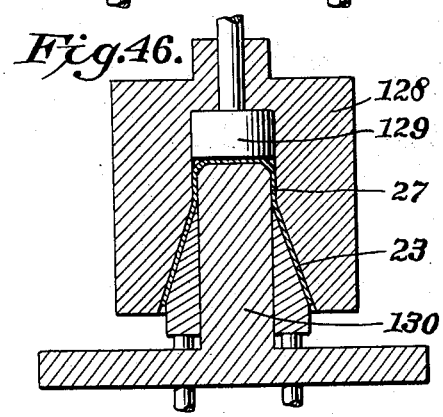
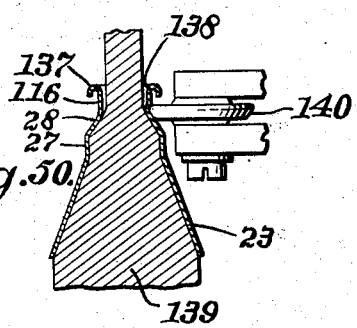
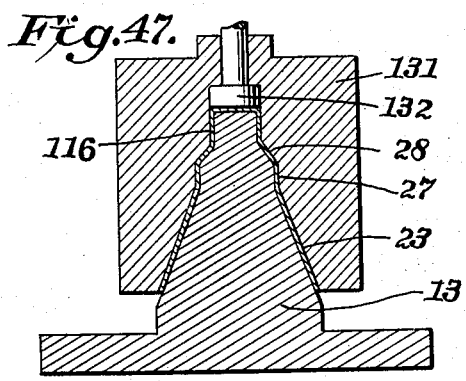
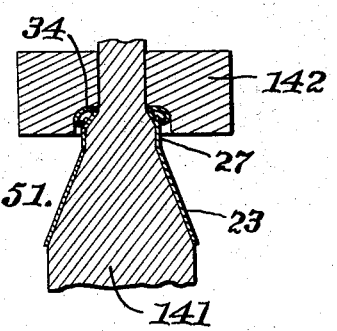
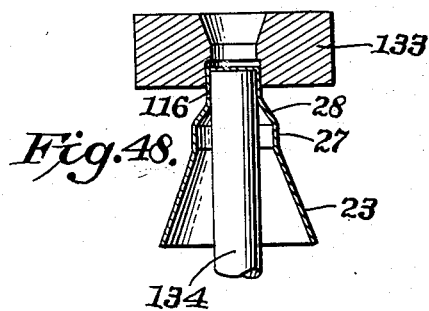
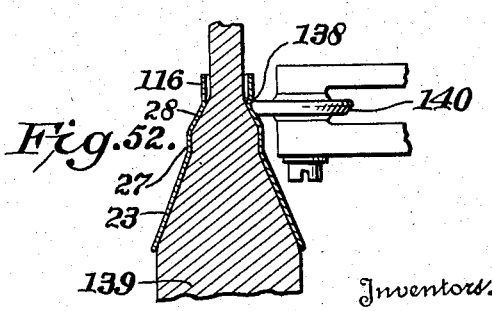

Patented Jan. 25, 1944

2,339,763

UNITED STATES PATENT OFFICE 2,339,763

CONTAINER AND METHOD OF MAKING SAME

Amos Calleson and Edgar A. Calleson, Merrick, N. Y., assignors to Crown Cork & Seal Company, Inc., Baltimore, Md., a corporation of New York Application March 21, 1941, Serial No. 384,568

2 Claims. (Cl. 113—120)

This invention relates to containers and methods of making the same and is particularly directed to improvements in metal receptacles of the can type. Such metal cans or metal bottles are best sealed with crown caps; i. e., a cap having a continuous skirt provided with crimps which are forced into sealing engagement with a locking shoulder adjacent the sealing lip of the container.

The principal object of the invention is to provide a metal container which is devoid of side seams, such as are generally employed with conventional metal cans, whereby a metal container is produced which is strong, presents a nice appearance, and is capable of simple and cheap production.

Another object of the invention is to produce a container of the seamless type having a separate body and top, each drawn and completely formed from a single blank of metal respectively, and then united into a substantially integral structure. The body is provided with an inwardly and upwardly directed edge portion defining a conical rim, and the top is provided with a corresponding conical body, which fits over and is centered and supported upon said rim in substantially frictional metal to metal contact. The rim and overlying top are united in a smooth joint, forming substantially continuous exterior and interior container surfaces, in any suitable manner, preferably by electric welding. A leak-proof container is thereby obtained, and, moreover, since the top is supported wholly by the body in the manner described, the container resists distortion strains occasioned by use of automatic capping machinery; for instance, that employed in applying crown caps. The metal body will preferably be of cylindrical shape, having the open rim portion at one end thereof and at the opposite end is provided with an integral, rigidified, closed end or bottom, or this bottom end is also open and the edge formed with a seaming flange for securing a separate bottom to to the body. The metal wall of the completed container body has an increased gauge over that of the original metal stock from which it is drawn. This gauge increases progressively from the bottom end of the container body to the upper edge or rim portion, whereby the overlapping joint between the top and the rim is strengthened for certain types of containers. Moreover, the metal at the lower end of the container body is the least drawn and has characteristics of gauge, hardness, and ductility more nearly approaching those of the metal in the original sheet or blank from which the body is drawn than the metal at the rim portion of the body. This is advantageous where the body is provided with an integral, rigidified bottom, since it permits the metal at the closed end to be subjected to severe metal working operations incident to the forming of such an integral bottom.

The drawn container top is formed with a substantially straight, cylindrical, and integral wall portion or neck at the apex of its conical body which terminates or merges into an integral sealing lip including the pouring mouth and cap receiving finish in the form of a hollow bead providing an overhanging shoulder. The cap receiving finish is characterized by a relatively wide, i. e. flat, sealing surface, and the overhanging shoulder is of greater diameter than the wall portion or neck of the container top thereunder, whereby a cap, such as a crown cap, may be tightly crimped and locked upon the shoulder. The bead has a curvature adapted to provide sufficient rigidity to resist the thrust applied during application of a crown cap, and the free edge of the bead is preferably hemmed. The neck and cap receiving finish will accommodate the usual crowning throat, and the neck portion also serves to resist axial strains incident to crowning pressures. Moreover, since the wall portion of the top or the neck above the conical body is of relatively smaller diameter than the cap finish immediately above it, a conventional type of opener may be employed for removing a cap.

The metal wall of the top increases in gauge progressively from the sealing lip of the top to the lower edge of the conical body portion which is likewise advantageous in forming a strong joint with the conical body rim. Also, this permits the cap receiving finish to be formed integral with the top. That is, the upper portion of the top, because it has characteristics such as gauge, hardness, and ductility more nearly approaching those of the metal in the original sheet or blank from which it is drawn than the metal at the lower end of the top, is better suited for the severe metal working operations of bending and forming incident to providing the top with an integral mouth and cap receiving finish or bead.

Equally important with the foregoing, it is an object of the invention to produce a sealing lip providing a pouring opening or mouth integral with the top of the container and defined by an inwardly and upwardly inclined wall merging into the wall of the top without interruption. In this manner, the contents may readily flow without danger of collecting or foaming in the container or around the mouth thereof, the wall of the mouth being extended to form the overlying bead by which it is substantially concealed.

It is likewise an object of the invention to provide a container in which the entire interior wall is smooth and unobstructed. Hence, the can may be provided with a continuous protective lining and may also be thoroughly washed and drained without permitting collection of the washing fluid within the container or about the pouring opening thereof. In like manner, the exterior of the container is smooth and easy to maintain clean.

It is an important advantage of the invention that the container may be better decorated than the usual tin can. That is to say, with the present container, the decorating may be applied after the body is formed, and the decoration may cover the entire body and top portion thereof. This is a decided improvement, in that in the decoration of conventional metal cans, it is necessary to apply the decoration to the metal before it is formed to shape, and in such seamed containers, it is required that areas adjacent the seams be left vacant, because the soldering heat injures any decorative coating along the seam lines.

The container is useful for dry, liquid, or plastic contents, such as foods, medicines, oils, etc. and finds particular utility in the case of pressure or carbonated beverages, such as beer. Because of the strength of the container, the contents may be heated therein; for example, at sterilizing or pasteurizing temperatures without danger of causing leakage or distorting the shape of the container.

A further object of the invention is to provide methods which will enable container bodies and container body tops of the character above described to be made by high speed production. Such methods embody progressively drawing the container bodies and tops and separately forming the same completely by continuous operations. It is unnecessary to interrupt the manufacture; for example, to anneal the metal at any point in the production, for the purpose of carrying out either the drawing or forming of the body or top.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation, and it is not intended to limit the invention claimed herein beyond the requirements of the prior art.

In the drawings:

Figure 1 is a sectional view of a container in accordance with the present invention provided with an integral body and bottom, and a separate top supported by the body upon a substantially inwardly and upwardly inclined rim at the upper edge of the body;

Figure 1a is a front elevation of a crown or crimped cap;

Figure 2 is a sectional view showing a top provided with a sealing lip having a mouth and locking bead for a skirted closure, such as a crimped cap, shown locked in position thereon;

Figure 3 is an enlarged partial view in section of the top with the mouth and locking bead similar to Figure 2 but with the cap removed;

Figure 4 is a sectional view of the body of the container shown in Figure 1 having a joining and supporting rim for the top and an integral bottom;

Figure 4a is a fragmentary sectional view of a modified form of body rim and the joint between the top and the rim;

Figure 5 is a sectional view of the top shown in Figure 1;

Figure 6 is a sectional view of a modified form of container, such as shown in Figure 1, and wherein the side wall is provided with circumferentially extending spaced projections;

Figure 7 is a sectional view partly broken away showing the rim of the body having the metal at its free edge turned over so as to be concealed by the overlapping conical top at the joint;

Figures 8 to 12 are sectional views partly broken away of modified integral bottom constructions;

Figures 18 to 20 are sectional views of the top showing the sealing lip including the mouth and cap locking bead in various stages of formation and also showing the bead provided with a hemmed edge;

Figure 15:
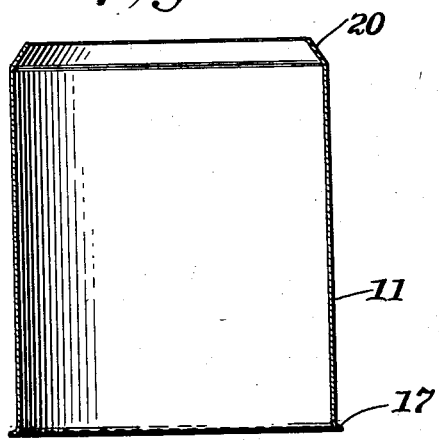
Figure 15 is a sectional view of the can body provided with a rim at its upper end and a seaming flange at its lower end for engagement with a separate type of bottom.
Figure 27:
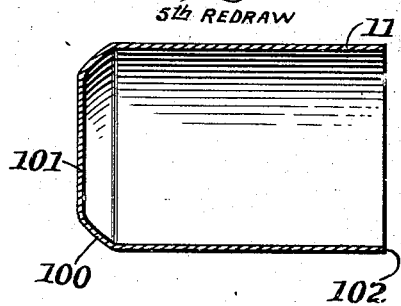
Figure 28:
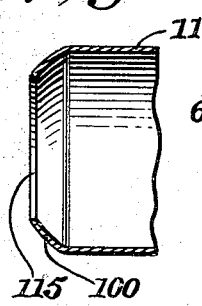
Figure 34:
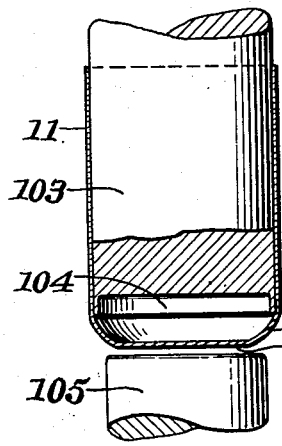
Figure 35:
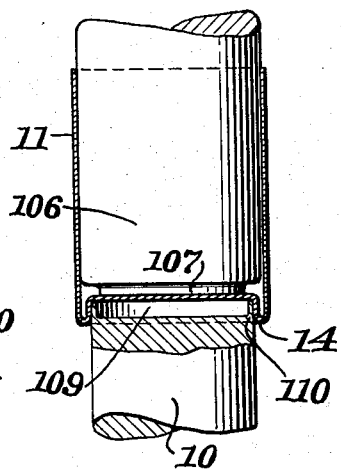
Figure 36:
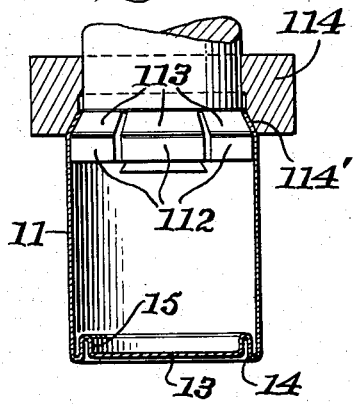
Figure 40:
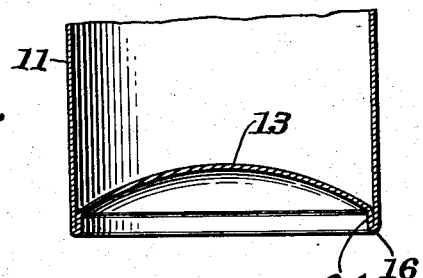

Figures 21 and 22 are sectional views partly broken away showing separate bottoms applied to the body of the container by a folded seam, the seam in Figure 21 lying within the plane of the wall of the body while the seam in Figure 22 lying without the plane of the wall of the body, it being understood that with the various forms of the invention, integral or separate bottoms may be utilized alternatively;

Figures 23 to 27 inclusive are diagrammatic sectional views illustrating the manner in which the body is drawn progressively from a cup-shaped blank;

Figure 28 is a sectional view partly broken away showing the manner in which the body illustrated in Figure 15 may be formed by severing the closed end of the blank of Figure 27;

Figures 29 to 33 inclusive are further sectional views of modified forms of cap receiving finishes integrally formed with the top of the container;

Figures 34 to 36 are diagrammatic sectional views illustrating one method of producing the container body with an integral bottom;

Figures 37 to 39 and 41 to 44 are sectional views partly broken away showing further forms of separate bottoms and the methods by which they are united to the body;

Figure 40 is a sectional view of another type of integral bottom; and

Figures 45 to 52 are sectional diagrammatic views showing the manner in which the top is drawn and also showing a further method of producing the sealing lip including the mouth and bead.

In Figure 1 of the drawings, the container is indicated as a whole at 10 and is preferably formed of relatively thin sheet steel; e. g., a relatively rigid metal, such as tin coated steel, ordinary black iron, or cold rolled black plate having a thickness in the neighborhood of .0125 inch to .0132 inch. The container will be lined with a suitable coating continuously over the interior of the bottle and permanently adherent to the metal. This coating is resistant both to the contents and to the processing conditions which the container may encounter, so that the possibility of undesirable flavors or odors developing is prevented. The container body, as shown at 11 in Figures 4 and 15, is preferably of uniform diameter and cylindrical or rounded, but it may have other cross sectional shapes, such as square, rectangular, etc. A variety of sealing means are useful, but we prefer to use a crimped closure of the crown type as shown at 12 in Figures 1a and 2.

The body shown in Figure 4 and employed in the bottle illustrated in Figure 1 is provided with an integral closed end or bottom 13. This bottom is reinforced and strengthened against internal pressures in the container, as well as crowning pressures and is constructed to assure that the container will stand upright. The metal at the periphery of the bottom and adjacent the container wall is turned inwardly and upwardly as at 14 and reversed to a lesser extent; i. e., bent inwardly and downwardly as at 15, so that the major portion of the bottom 13 extends inwardly from and above the curved supporting edge 16 and is supported by the metal folds. The reverse bends or metal folds 14, 15 are preferably close together and to the container wall, so that a very rigid bottom, resistant to the pressure conditions described above, is produced. The bottom 13 is in a horizontal plane above that of the lower edge 16 for a distance such that any outward bulging of the bottom which may take place under abnormal conditions of internal pressure will not project it below the edge 16 and cause the container to turn over on its side.

The body 11 shown in Figure 15 has its bottom open, and the bottom edge is formed into an outwardly directed seaming flange 17 whereby a separate bottom 18 may be seamed to the body as shown, for example, at 19 in Figures 21 and 22 where the folded seam is disposed within the plane of the body and without the plane of the body respectively.

As heretofore stated, containers in accordance with the present invention may have either a body as shown in Figures 4 or 15; i. e., integral or separate bottoms may be employed.

Referring to Figures 4 and 15, and to Figure 1, the open end of the top of the body 11 is provided with an inwardly and upwardly directed inclined edge portion or rim 20 which is of tapered form and of progressively reduced diameter with relation to the remainder of the body portion, the said rim extending continuously upwardly at a uniform angle directly from the cylindrical body portion of the container. In Figure 4a, the top edge of the cylindrical wall of the body 11 is curved inwardly slightly as shown at 21 from the cylindrical wall, and the remainder of the rim 20 is inclined inwardly and upwardly as heretofore described.

Referring to Figure 1, there is supported by the body 11 upon the rim 20, a top indicated as a whole at 22 and shown in detail in Figures 2 to 5 and Figures 45 to 52. The top 22 has a conical body portion 23 which is so tapered or of such progressive diameter that when the top 22 and body 11 are assembled as shown in Figure 1, they will have a frictional metal to metal contact as shown at 24, and the rim is concealed within the top. In other words, the lower edge portion of the conical body of the top intimately fits the rim 11 in overlapped centered relation since the angle of the rim 20 and of the conical body portion 23 are substantially the same. It will be noted that the conical body portion extends upwardly continuously from its lower edge in the form of a cone. The two parts are united by welding, preferably electrical welding, although soldering or any other suitable securing medium may be employed. The leakproof joint 24 thus provided is interiorly and exteriorly smooth, and strong enough to resist heavy axial pressures, such as capping pressures, notably those occasioned by applying a crown cap with automatic machinery which frequently reach as high as 800 pounds. The top 22 is thus supported entirely by the rim 20, and the inner and outer wall surfaces of the container are substantially uninterrupted and devoid of projections throughout the cylindrical body portion. The interfitting relation of the rim 20 and conical body portion 23 is such that the lower edge of the conical body portion of the top terminates above the cylindrical body which is of greater diameter than the lower edge of the cone-shaped top, whereby said lower edge does not project outwardly beyond the upper edge of the cylindrical body. Thus, there are no rough edges or irregular projections presented such as might in handling mar the decoration of adjacent finished containers by contact with same, or injure the hands of a user. Moreover, the freedom from outward projections assures against distorting the top or body or separating the same should the container strike obstacles in handling. Such a joint between the top and body is obtained equally well with the construction shown in Figure 4a where it will be noted, the lower edge of the top 22 does not engage or rest upon the curved portion 21.

Referring to Figure 7, the rim 20 has its free edge outwardly bent or turned into a hem 25, whereby at no point in the container will the contents be exposed to the free or raw edge of the metal, since the hemmed portion 26 is overlapped by the top. This hemmed edge portion 26 lies in the plane of the outer surface of the rim so that the rim surface presented to the conical top is substantially smooth and uninterrupted. Of course, with a construction such as shown in Figure 1, the free edge of the rim presents a negligible area to the contents, and the construction of Figure 7 is used in any case where it is desired that the contents not contact the raw edge.

The joint 24 between the top and body eliminates the possibility of distorting, bending, or cracking of the metal of the two portions forming the bottle, and not only is a substantially continuous, one-piece bottle appearance obtained, but the joint is substantially free of leakage and rigid and strong as regards both internal and crowning pressures and handling conditions. Of particular importance, the metal lap permits welding particularly or soldering to be used to seal and secure the joint. Moreover, it is to be noted that there is necessary but a single connection for the two bottle portions which is disposed above the container body and at a point where the axial crowning pressures are distributed radially. That is, the axially directed crowning pressures are absorbed by the large area of the tapered top, and hence at no point in the base of the tapered portion where it is lapped by and joined to the rim is the full crowning pressure exerted. Rather, the crowning pressure is equalized and so distributed, and the joint is so reinforced that the smooth union of the parts and the seal is undisturbed.

The conical top 22 has its tapered body merging into a cylindrical, substantially straight, relatively narrow wall or neck 27 as shown in Figures 3 and 20. From this wall, the metal is bent inwardly and upwardly as shown at 28, thereby forming with the wall 27 a smooth, uninterrupted, conical mouth constituting the filling and pouring opening which is of upwardly progressively reduced diameter. As shown in Figures 18b and 49 to 52, the metal of the neck above the mouth, in the preferred form of the invention, is continued from and beyond the tapering shoulder 28, being further bent or curled outwardly, downwardly, upwardly, and then inwardly about the neck wall or mouth into a continuous, circular hollow head 29 which constitutes the cap receiving finish for receiving a crimped or crown cap as shown in Figures 2, 3, and 20.

The sealing bead, as shown most clearly in Figures 3 and 5, preferably overlies so as to conceal substantially completely, the inwardly and upwardly inclined wall 28 with the outer surface of which it is preferably substantially in contact so as to be supported when under pressure. In other words, the inner edge portion 30 of the bead overlies substantially in contact the lower portion of the inclined wall 28 approximately where it joins the straight wall of the neck 27. In this manner, there is provided a support for the bead to resist crowning pressures at the under-wall portion nearest the greatest diameter of the bead and substantially directly from the straight wall 27 of the neck. Thus, there is a minimum amount of radially projecting unsupported portion of the bead. Not only is the appearance of the container improved by the concealment of the inclined wall 28, but the bead is rigidified and the contact of its inner edge portion with the wall 28 closes the bead and prevents ingress of foreign matter which would otherwise tend to collect within the bead. Since the bead is of larger diameter than the portion of the container, i. e., the neck, immediately therebelow, it provides a freely engageable locking shoulder for a crown cap having the desired maximum rigidity, because of the formation above described.

The free edge of the sealing bead may be plain, as shown in Figures 3 and 4, but it is preferably folded or hemmed as shown at 31 in Figures 19 and 20. This free or folded edge preferably is substantially in contact with, so that in use it may rest upon and be supported by, the outer surface of the inclined wall 28 adjacent its juncture with the neck 27 as shown in Figure 20. This support is obtained by turning the inner edge portion of the bead, so that, as shown in Figures 3 and 5, one bead surface near the inner bead edge substantially parallels and overlies the inclined wall 28 in contact, or substantially so, therewith. The hemmed edge of Figure 20 not only avoids splitting of the metal during forming of the bead, but also aids in preventing distortion when a crown cap is applied or pried off of the bead, since the reinforce of the hem resists distortion of the bead under pressure and also assists in the formation of a bead of the desired contour.

The hemmed edge precludes the formation of cracks or splits in the edge during formation of the bead or during use of the container. If, incident to this forming operation, there takes place slight or incipient cracking of the free edge of the bead which is not readily observable, because the free edge is turned under, the hemmed or folded formation prevents such splits from enlarging and breaking the body of the bead, as when the bead is strained during application of a crown cap. Moreover, the hemmed edge maintains the shape of the bead under the high crowning pressures, and thus insures that at all times an effective seal will be provided, since it affords a stronger lip which will have and retain the desired contour while the container is in use.

The bead 29 is of sufficient area or diametrical cross-section to extend beyond the wall of the neck, and, as shown, forms a cap receiving finish including a continuous, circular crown-locking shoulder 32. Since the bead is of greater over-all diameter and circumference than the wall of the top immediately therebelow, the inwardly bent locking shoulders 33' of the crown cap 12, as shown in Figure 2, may be firmly locked or crimped beneath the continuous shoulder 32 to form a highly satisfactory seal. The crown cap 12 has a cushion liner 33 engaging the wide, i. e. flat, top 34 of the bead 29 and flowing downwardly therefrom about the bead as shown in Figure 2. In some cases, a center spot is affixed to the cushion liner 33, as well known.

It is to be noted that the bead is firmly supported on the top of the container by having its free or hemmed edge overlying or resting upon the lower end of the inclined wall 28 and that capping strains are transferred directly from the bead to the neck 27 and thence to the container top and body.

The bead 29 is not uniformly curved, as will be noted, but it extends outwardly from the mouth with a relatively flat top surface indicated at 34 in Figures 3 and 20, and then curves continuously downwardly, inwardly, and upwardly, so that its inner edge portion rests upon the outer surface of the inclined wall 28 approximately at its lower edge where it joins the neck 27. The inclined wall 28 and the top surface of the bead thus form a bead of such cross-section that its area increases in dimension along axial lines of the container outwardly from the mouth, and the upper and inner portion of the bead at the mouth is substantially V-shaped in cross-section as shown at 35 in Figures 3 and 20. Such a formation affords a bead which is very rigid to resist deformation in use and particularly under crowning pressure; i. e., the shoulder 32 has a curvature adapted to provide sufficient rigidity to resist the thrust applied during application of a crown cap. Moreover, this formation provides a relatively wide, substantially flat top-sealing surface 34, as shown in Figures 3 and 20. This flat surface assists in obtaining a suitable seal, particularly with closures of the center spot type in which the sealing surface must be engaged entirely around the mouth, partly by the center spot and partly by the cushion liner of the cap.

In assembling the bottle, the body 10 and top 22, which are devoid of any seams, each being separately and completely formed from a single piece of metal, have their tapered portions centered and fitted into a metal to metal frictional engagement as shown in Figure 1 with the top entirely supported on the rim 20. The joint is sealed and the parts secured together by welding or soldering at the joint 24. The metal to metal contact at the joint 24 will enable welding to be simply and inexpensively accomplished.

The can, as shown in Figure 1, has a substantially smooth interior and exterior since the lower edge of the conical body portion of the top terminates above the cylindrical body and within the projection of the outer cylindrical surface of the body, and in addition, its bottom is reinforced and rigidified while the tapered body 23 of the top portion will distribute the axially directed crowning pressures. The straight cylindrical neck or wall 27 will reinforce the locking shoulder or bead 29 and the latter, by reason of its construction, will assure optimum sealing engagement with the cushion liner of the cap as well as permit the crown cap to be crimped over the bead into sealing engagement with the shoulder in the usual manner. The provision of the inwardly bent shoulder 28 upon which the free edge of the bead or curl 29 rests as best shown in Figures 3 and 20, is an important feature of the invention in that, as stated, the locking shoulder 32 will not collapse under crowning pressures, and the cap may be crimped over the locking shoulder and the cushion liner drawn into sealing engagement with the top 34 of the sealing lip of the container without fear of collapsing the bead. Thus the container may be used with present types of automatic capping machinery without fear of injury and with assurance that an effective seal of the contents will be obtained.

Referring to Figure 6, the body portion 11 is sometimes formed with spaced peripheral projections 37 which are suitably pressed out of the metal wall. These projections are not at all times necessary, but are used where the bottles are subjected to unusual abrading contact to prevent marring of the decoration on the body.

In Figure 8 I have shown another type of stiffened and reinforced integral bottom for the bottle, suitable for withstanding unusually high internal or external pressures. This bottom is formed by bending the metal upon itself as shown in full and dotted lines at 38 and then curling up the portion 38' into a loop as shown at 39 whereupon the bottom 13 is pressed down below the top 40 of the loop as shown at 41. The doubled metal layers are pressed or rolled together as shown, producing a bottom of very substantial rigidity, and it is to be noted that the lower edge 16 of the container is in a plane below that of the bottom portion 13 as in the case of the bottom construction shown in Figure 1. This construction shown in Figure 8 embodies a reverse bending of the metal at the periphery of the bottom adjacent the wall of the body of the vessel as described in connection with Figure 1, but includes the doubled metal loop 39 positioned between the flange 41 and the doubled metal wall 38, the inner layer of which is continued over the top 40 of the loop 39 and downwardly to a lesser extent forming the upstanding flange or wall 41 of the bottom portion 13. The metal as stated is pressed upon itself to form in effect a doubled metal flange.

In Figure 9, another form of rigidified bottom is illustrated wherein the metal wall of the container is curved inwardly as at 42 and then bent upon itself upwardly and outwardly as at 43 and then bent upon itself downwardly and inwardly as at 44 to form a doubled metal bottom. The layers 42, 43, and 44 are pressed upon each other so as to have a metal to metal contact as with the doubled metal flange of Figure 8. The bottom portion 13 is disposed in a plane above the lower edge 16 of the container which, as shown, has a curved outer surface extending inwardly, the bottom being stiffened and rigidified at its periphery by the peripheral metal layers 42, 43, 44.

The construction shown in Figure 10 is substantially similar to the construction shown in Figure 1 except that the reverse bends or folds 14, 15 are spaced a relatively wider distance and from the container wall, the spacing between the folds being less than between the fold 14 and the container wall. The lower edge 16 presents a relatively wide curved surface.

In Figure 11 the rigidified bottom is bent upon itself to form a bead 45 preferably hollow and closed by contact of the metal with the wall of the container as at 46, and the metal is then turned or bent inwardly from the wall of the container to produce the substantially bowed bottom 13. In the circular peripheral recess defined between the top of the bead 45 and the adjacent undersurface of the bottom 13 at the point of reverse bending 46 adjacent the wall of the container, there is interposed a metal disc 47 which is held in the recess by frictional engagement with the underside of the bottom portion and the adjacent top surface of the bead. This construction likewise affords a very rigidified bottom.

In Figure 11a there is illustrated a modification of Figure 11 wherein the bead 45 is rolled or squashed more completely to clench the disc 47 between the underside of the bottom portion 13 and the bead 45. Such construction affords a further means of providing a rigidified bottom.

Figure 12:
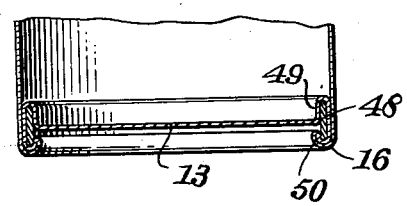

In Figure 12 the rigidified bottom is similar to that shown in Figure 1, but includes a vertically disposed metal band 48 positioned at the periphery of the bottom between the upwardly bent portion of the wall of the container and the reversely bent portion 49 forming the upstanding wall or flange of the bottom portion 13. In this construction the metal adjacent the wall of the container is doubled upwardly upon itself and then carried over to form the wall or reversely bent portion 49. Thereupon the metal band 48 is interposed between the doubled wall and wall 49, and the walls and band are pressed or rolled together while the lower edge 16 of the doubled wall is curved inwardly beneath the band 48 and upwardly to engage the inner face thereof as shown at 50.

Figure 13:
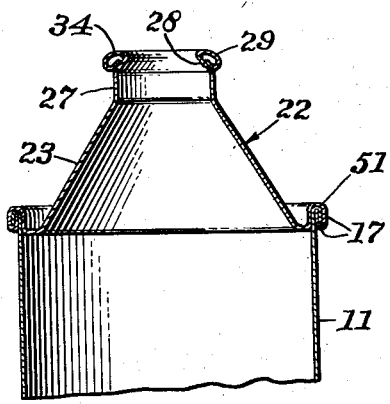
Figure 13 is a sectional view partly broken away showing the top and body united by a folded seam.

In Figure 13 there is illustrated a body 11 provided at the upper end with a seaming flange 17 and a top portion 22 pressed from a single piece of metal having a seaming flange 17 at the free edge of its conical body portion, but otherwise the container is in accordance with this invention. The top and body are united by a circumferential double seam 51 in the usual manner.

Figure 16:
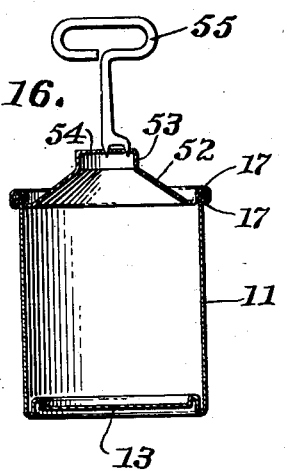
Figure 16 is a sectional view showing a modified form of container.

In Figure 16 the container is formed with a one piece body portion 11 having an integral bottom 18 as previously described, but is provided at its top open edge with a seaming flange 17 and the top 52 is in the form of a relatively shallow conical body having a cylindrical neck 53 of reduced diameter terminating in a closed end 54. The conical body 52 is formed with a peripheral seaming flange 17. After the body 11 has been filled, the top 52 is applied, and a suitable double seam is formed by means of the seaming flanges 17 as shown for uniting the top and body and sealing the container. To remove the contents, a suitable tool 55 is applied to the closed top 54 of the top portion 52 to produce a pouring opening. It is to be understood that the top portion 52 is formed from a single piece of metal as with the body portion, and the top 54 instead of being removed as with the constructions previously described, remains integral with the top portion.

Figure 17:
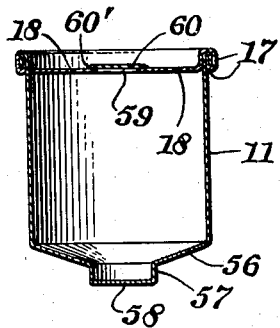
Figure 17 is a sectional view showing a further modified form of container.
Figure 23:
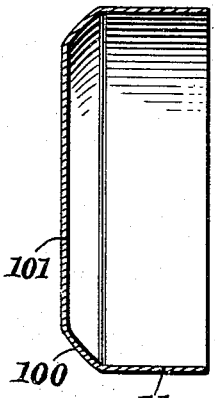
Figure 24:
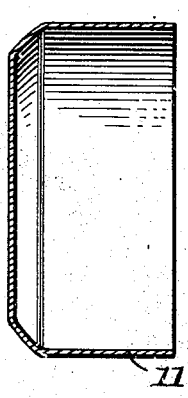
Figure 25:
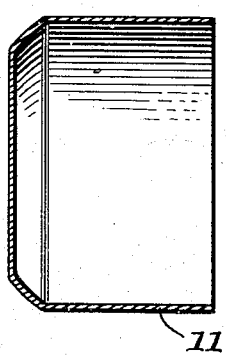
Figure 26:
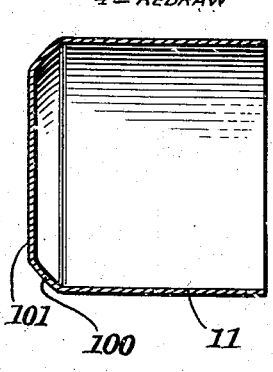

In Figure 17 the body portion 11 is formed with an integral shallow tapered or conical top portion 56 terminating in a closed cylindrical end portion or neck 57 of reduced diameter having an integral closed end 58. The bottom of the container is connected to the body portion after it has been filled by means of seaming flanges 17 forming a usual type of double seam. With this construction the top 58 will be perforated with a tool 55 as previously described in connection with Figure 16. In some cases the bottom may be first applied as shown and then the container filled through an opening 59 which is thereafter closed by a disc 60 soldered to the bottom 18 at 60'.

Figure 14:
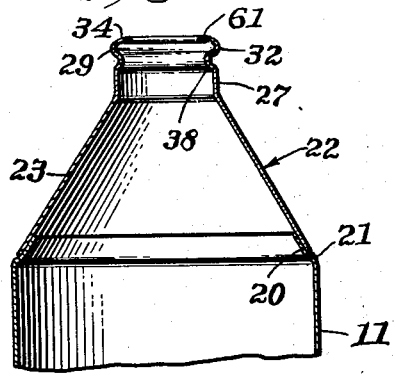
Figure 14 is a sectional view partly broken away showing the top provided with another type of cap receiving finish.

Figure 14 shows a top which may be used instead of those shown in Figures 3 or 20. The top has an integral neck terminating in an inclined wall 38, from which the metal is turned outwardly to define a shoulder as at 32, and then inwardly as at 34 to form a hollow bead 29 or sealing lip disposed adjacent to and above the wall 38. As will be noted, the bead is of greater diameter than the wall 38 which is immediately therebelow. This bead forms a finish or cap receiving means for a crown or crimped cap, and the shoulder 32 has a curvature, as in the forms of Figures 3 and 20, adapted to provide sufficient rigidity to resist the thrust applied during application of a crown cap. The upper surface of the bead is flattened as shown at 34 to assure sealing engagement with the cushion liner 33 of the cap, and the free edge may be turned inwardly into a hem 61 or outwardly into a similar hem. The container of Figure 14 is constructed in accordance with Figure 4a.

Figure 29:
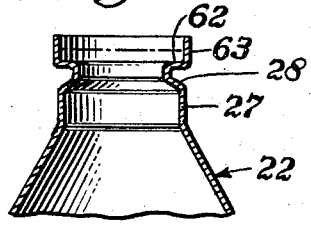

In Figure 29 the metal above the neck 27 is bent inwardly to form the upwardly inclined wall 28, outwardly to form an internal shoulder 62 and upwardly to form an upstanding flange 63. A suitable flat disc or cap 64 and including a metal layer or a suitable coating which may or may not be decorated is positioned on the shoulder 62 and thereupon the flange 63 is bent over the peripheral edge of the cap to engage the exposed surface thereof as shown at 65 in Figure 30. In order to remove the cap, it is necessary to release the engagement of the bent-over portion of the flange 63 from the surface of the cap which will result in distortion of the container and prevent its re-use. Cap 64 can also be punctured, if desired.

Figure 31:
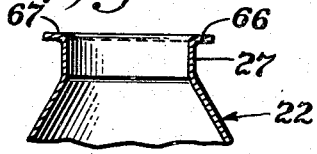
Figure 32:
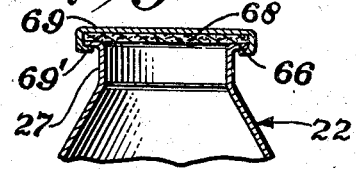
Figure 30:
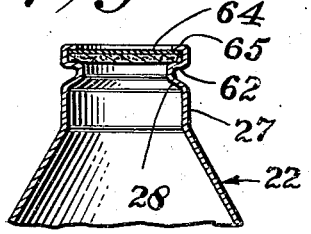

In Figure 31 the neck 27 is formed with an outwardly projecting flange 66 having a flat upper surface 67 for receiving a suitable cap or disc 68 as shown in Figure 32. Thereupon a metal cover 69 is positioned over the cap, and its marginal edge portion is bent around the cap and into contact with the underside or locking shoulder of the flange 66 as shown at 69' to clamp the cap to the container. By releasing the inbent portion of the cap from the shoulder, the seal is released, and the metal cover may be soft and replaceable or distorted in removal so as to prevent re-use. Cap 68 can also be punctured.

Figure 33:
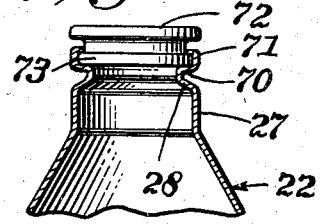

In Figure 33 the neck is provided with an inwardly bent upwardly inclined wall 28 forming an internal shoulder 70 having a flat surface and a locking groove 71 cooperating with the shoulder. A suitable cap 72 having a circumferential projection 73 which is seated in the locking groove 71 is employed. The metal forming the locking groove 71 may be pre-formed so that the cap is sprung into the groove, or the cap may be first positioned upon the internal shoulder 70 and the metal constituting the groove then pressed about the projection 73. The cap may be removed by any suitable pry-off device similar to that used for crown caps. It is to be noted that with each of the constructions shown in Figures 1, 14, and 29 to 33, the locking shoulder, bead, or finish for the cap extends outwardly beyond the wall of the top or neck immediately therebelow. Each of the constructions is sufficiently rigid to withstand the capping pressures, and since the finish in each case is of greater diameter than the wall of the top immediately therebelow, there is ample room for the insertion of an opener for the removal of the cap.

Referring to Figures 21, 22, 37 to 39, and 41 to 44, there are illustrated various forms of separate bottoms which may be employed with any of the containers in accordance with this invention. As previously described, the body blank 11, as shown in Figure 15, is provided with seaming flanges 17, and by means of similar flanges on the bottoms 18 illustrated in Figures 21 and 22, a suitable folded or seamed joint for sealing the bottom of the container is produced. The bottom in Figure 22 is bowed inwardly, while the bottom in Figure 21 is plane.

Figure 37:
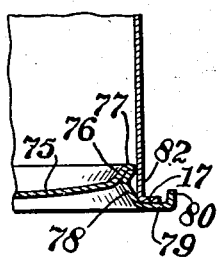
Figure 38:
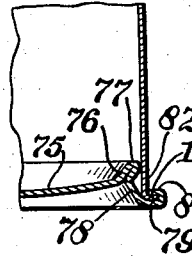
Figure 39:
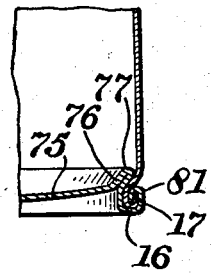

In Figure 37 the bottom portion 75 is downwardly bowed, and at its edge, the metal is doubled as shown at 76 and then continued to extend upwardly and outwardly as at 77. Thereafter, the metal is continued and bent into a peripheral flange 78 extending downwardly and outwardly and terminating in a flat peripheral flange 79 having an upwardly extending terminal flange 80. The container body has an outwardly extending peripheral seaming flange 17 of less length than the flange 79 upon the upper face of which it is placed for assembly. Thereupon, as shown in Figure 38, the flange 80 and the outer portion of the flange 79 are curled over the flange 17 as shown in Figure 38, whereupon the metal is rolled so that the seam 81 of Figure 39 is formed and positioned vertically flush with the wall of the container. The intermediate straight portion 82 of the container wall, as shown in Figures 37 and 38, is bent inwardly into contact with the underface of the double wall 76, 77 at the marginal edge of the bottom 75, as shown in Figure 27. This seam 81 may be soldered or welded, or provided with plastic sealing medium, as desired.

Figure 41:
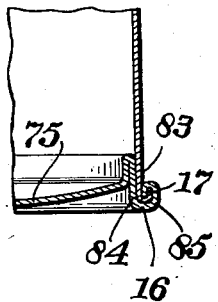

Referring to Figure 41, the bottom 75 is downwardly bowed, and adjacent its periphery, the metal is doubled upon itself as shown at 83, to define an upstanding double flange, from which the metal is continued downwardly as shown at 84, and outwardly as shown at 85, to provide a seaming flange for engagement with the seaming flange 17 of the container body. The bottom is fitted in position, and the folded seam is produced as shown in Figure 41, with the double wall 83 engaging, in sealing relation, the adjacent wall surface of the container body.

Figure 42:
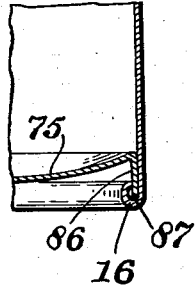

In Figure 42 the bottom 75 is bowed downwardly and has a downwardly extending peripheral flange 86 which is welded to the adjacent wall of the container. The lower edge of the container wall is curved around the lower edge of the flange 86 to grip the same as shown at 87.

Figure 43:
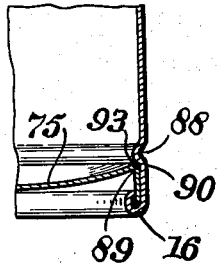

The construction shown in Figure 43 is similar to that shown in Figure 42, with the exception that the body of the container is formed with an inwardly extending peripheral projection or stop 88, and the meeting angle 89 between the bottom 75 and the flange 86 is positioned or centered against the underside of this projection as shown at 90 and may be welded thereto. The flange 86 and the adjacent wall of the container are also welded together. The constructions of Figures 41 and 42 may be similarly welded.

Figure 44:
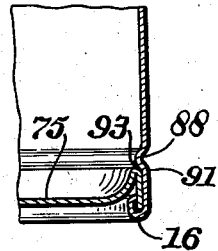

The construction shown in Figure 44 is similar to that shown in Figure 43, except that the bottom 75 is more completely bowed or pressed and forms a more acute angle with the flange 86 as shown at 91. This separate bottom 75 has the acute angle portion defined by the bottom and the flange welded, if desired, to the inside of the peripheral guide projection 88 and likewise has its flange 86 welded to the adjacent wall of the container.

In each of the constructions shown in Figures 21, 22, 37 to 39, and 41 to 44, the bottom is disposed above the lower edge 16 of the container as in the construction shown in Figure 1. Whereas the bottom seam in Figures 22 and 41 extends outwardly from the wall of the container, the seam constructions of the other figures have the seamed or rolled edge extending inwardly of the wall of the container, so that the wall is substantially smooth and unobstructed throughout.

In each of the constructions shown in Figures 21, 42, 43, and 44, the upper surface of the bottom is substantially continuous with the inner surface of the wall of the body, and this is particularly true in Figures 21, 43, and 44, where the angle between the bottom and the bottom flange permits the upper surface of the bottom to merge continuously with the inner surface of the internal projection 88 as shown at 93.

Referring to Figure 40, there is shown another form of integral bottom 13 in which the wall of the body is folded upon itself to provide a peripheral doubled wall 94, from which the metal of the bottom is bowed upwardly, as shown.

The body 11 shown in Figures 4 and 15 is drawn from a single blank of metal as shown in Figures 23 to 28. In Figure 4, the bottom is formed integral with the body, and in Figure 15, the body is formed with an outwardly extending seaming flange 17. The bodies in either case are drawn and completely formed before assembly with the completely formed top, or top and bottom, as the case may be.

Referring to Figures 23 to 27, the body is drawn from a cup-shaped blank or sheet. That is to say, the entire axial and circumferential dimensions of the body are drawn from a single blank. The drawing is continuous in immediately succeeding steps to increase the depth and decrease the diameter of the blank as shown in Figures 23 to 27 and provide a relatively deep cup, Figure 27, the body of which is cylindrical and at one end circumferentially inclines inwardly at 100 into a closed, flat end 101. This body is characterized by a gauge which increases progressively from the portion 100 continuously to the open end 102, and the gauge is increased over that of the initial metal of the cup-shaped blank. This increase in gauge is due to the fact that as the cup is decreased in diameter, the excess metal is not all used to increase the length, but some is worked so as to increase the thickness of the wall progressively from near the top to the open end, thus providing a container body side wall which progressively increases in thickness. This not only facilitates manufacture, but also provides a container body of increased strength and rigidity. After the body has been drawn, as shown in Figure 27, it is ready to be operated upon to form the rim 20 and integral bottom 13 as shown in Figures 34 to 36, or the rim 20 and seaming flange 17 as shown in Figures 15, 28, and 36.

In constructing the body shown in Figure 4 with an integral reversely bent bottom as shown in Figure 1, the blank illustrated in Figure 27 is acted upon as shown in Figures 34 and 35. A die 103 having a recess 104 is disposed in the body and a movable die 105 acts upwardly upon the bottom 101 to produce an upward fold as shown at 14 in Figure 35. The die 105 is of slightly less diameter than the diameter of the recess 104 in the die 103. Thereafter, the bottom is pressed downwardly in the reverse direction as shown at 15 in Figure 36 by disposing as shown in Figure 35 within the body a movable die 106 having a projection 107 of reduced diameter acting upon a fixed die 108 positioned in the recess 109 on the outside of the bottom and provided with a recess 110 forming a female die in which the projection 107 works. In this manner, a reversely bent rigidified bottom is produced as shown in Figures 1, 4, and 36. By means of suitable die members, integral bottoms as illustrated in Figures 6, 8 to 12, 16, and 40 are obtained. It is to be noted that the dieing and pressing operation for forming the integral bottom takes place upon the closed end 101 of the cup shown in Figure 27, where the metal has been least drawn in forming the cup 11, and by reason of its ductility, hardness, and gauge is eminently suitable for the severe dieing and forming operations incident to forming the integral bottom.

In forming the body 11, shown in Figure 15, the closed end 100, 101, is severed to an extent as will produce a container of proper length when the adjacent edge is formed into the flange 17. This flange is formed in any suitable manner.

In each of the body constructions 11 described, the more rigidified and thicker gauge metal is at the upper open end 102 of the body or cup shown in Figure 27, while the more workable and thinner gauge metal of the body wall is at or adjacent the lower or bottom edge portion 100, 101, of the body or cup shown in Figure 27.

The plain top edge portion 102 of the container body cup blank shown in Figure 27, in which portion the metal wall is of thicker gauge, is formed into the inwardly and upwardly inclined portion or rim 20 by inserting, as shown in Figure 36, into the cup body, a collapsible die 112 having an inclined or conical portion 113, and operating upon the body in cooperation with the die 112 with a movable die 114 having a correspondingly inclined portion 114'. In forming the conical rim, it is preferred that at its base, the same be slightly curved as shown at 21 in Figures 4a and 14.

By employing the more rigid metal of greater gauge for forming the rim, a stronger support for the top of the container is provided, and likewise, a better joint, resistant to crowning pressures, is obtained.

In some cases, the cup shown in Figure 27 has its flat end 101 severed as shown at 115 in Figure 28, and the inclined portion 100 is then formed into the rim 20, as shown in Figure 36, while the opposite end edge of the cup is formed with the flange 17 as shown in Figure 15. This construction may be employed for making certain types of containers. With such a container body, the rim 20 is formed from the least drawn metal of the cup and from the thinner gauge metal wall, while the seaming flange 17 is formed from the metal edge having the thicker gauge.

Referring to Figures 18 to 20 and 45 to 48, the top body 22 is drawn to the form shown in Figures 18a and 48 from a suitable cup-shaped blank and the closed end severed. In this drawing operation, the metal of the neck 27, and particularly the metal neck portion 116 above the neck, is not appreciably drawn, as compared to the metal of the conical body. Moreover, it is not appreciably increased in gauge as compared to the original stock. Hence, the metal above the neck 27 providing the sealing lip and which has to be severely worked in forming the mouth 28 and locking bead 29 is maintained relatively undrawn and close to the initial gauge which may be selected as the most suitable for forming the container; i. e., the metal which has been the least increased in gauge, and the least reduced in ductility is used to form the cap locking bead and mouth. It is, therefore, possible to proceed with the formation of the lip (as with the integral bottom 13) without discontinuing operations to anneal the metal to be included in the bead before forming the bead. The metal adjacent the enlarged open end of the top is more brittle and heavier in gauge than the original sheet from which the body is drawn and than the least worked metal in the neck portion. While the heavier metal of the conical portion because of its relative lack of ductility and brittleness would be comparatively unsuitable to receive a cap finish, particularly at the lower end of the conical portion, nevertheless, it has the strength to provide the required body rigidity and form a strong joint 24 with the rim 20.

The increasing of the gauge of the metal which is accomplished during the drawing operation of both the body and the top has the further advantage of permitting the use of initial sheet stock of thinner gauge than would otherwise be suitable. In other words, while the initial stock may be of sufficient thickness for the neck, mouth, and bead formation of the top, or the integral bottom and rim formation of the body, but not of sufficient rigidity for the body of the top or body, the latter may be given, during the drawing operation by increasing the metal gauge, the desired rigidity and strength to assure that the container will retain its shape under severe conditions of handling, capping, or retention of pressure contents, and also for forming the strong overlapping joint between the top and body. Moreover, structures in which the gauge of the metal progressively increases from the sealing lip to the lower edge of the conical body in the case of the top and from the bottom edge of the body to the conical rim or vice versa in the case of the body, may be made more economically and at higher speed and more uniformly than drawn structures in which the gauge is uniform or substantially so throughout the height of the container.

As illustrating one method of drawing the seamless top, and referring to Figure 45, the metal strip or plate is shown at 120, and the same is severed by the cutting dies 121, 122 into a blank and formed or drawn by cooperation of the fixed die 123 and movable die 121 into a substantially cylindrical cup-shaped blank 125 having a closed end 126 and a conical wall portion 127. 124 represents an ejector pad to clear die 121.

The cup-shaped body is now acted upon by movable die 128 containing ejector 129 and a fixed die 130 as shown in Figure 46 to draw a substantially conical or tapered body 23 and a cylindrical neck or top portion 27, the blank being of increased height and reduced diameter.

This top blank is now further drawn as shown in Figure 47 by cooperation of the fixed die 130 and the movable dies 131 containing ejector 132 to form the cylindrical portion 27 with an integral bent or conical end portion or shoulder 28 and a cylindrical closed end 116, the overall height of the top blank being further increased by this drawing operation. Thereafter, the closed end 126 of the top blank is punched or severed out by the cooperating fixed and movable dies 133 and 134 respectively as shown in Figures 18a and 48.

The top blank is now subjected to operations for forming the sealing lip including the mouth 28 and the bead 29 to receive a crown cap. Referring to Figure 49, a fixed die 135 inserted in the blank and a movable die 136 act upon the blank to produce an initial outward curl 137 at the free upper edge of the blank. Thereafter, the metal at the juncture of the inclined and cylindrical portions 28 and 116; i. e., the cylindrical portion at the top of the shoulder 28, is peripherally indented or inbent as shown in Figure 50 at 138, a suitable fixed die 139 being inserted in the top blank and a rolling die 140 acting upon the metal to inbend the cylindrical portion 116. The locking shoulder in final form is produced by inserting a fixed die 141 within the top and axially pressing by means of the movable die 142 upon the initially curled portion 137 to flatten the said curled portion as at 34 and formed the closed bead 29 providing the hollow locking shoulder 32 having its free edge portion curled upwardly and resting for a substantial area upon the outside of the shoulder 28. This locking shoulder will form a satisfactory sealing lip for the container since, as shown, the diameter of the locking bead 29 is appreciably greater than the wall of the top immediately therebelow, and, hence, will enable a crown cap to be positively locked in sealing relation upon the top. Moreover, the interior wall of the shoulder 28 merges with the wall of the neck and forms a smooth, continuous pouring outlet for the container.

It is to be noted that the top including the sealing lip providing the mouth and locking bead are formed from a single piece of metal and that the conical body 23 has its progressive diameter of a dimension so that it will frictionally engage the conical end or rim 11 of the container body by which is is supported, as shown in Figure 1, in interfitting relation.

Instead of carrying out the operation as shown in Figure 51 in the sequence shown, the indentation of the metal between the conical shoulder portion 28 and the cylindrical wall portion 116 takes place following the punching operation shown in Figure 48. This peripheral indentation 138 is shown in Figure 52 and thereafter the upper portion is curled as shown in Figure 49 and formed into the final locking shoulder and bead as shown and described in connection with Figure 51.

Instead of forming the sealing lip in the manner just described above and referring to Figures 18 to 20, after the neck wall 27—116 of the top is drawn to final form and the closed end is severed, as shown in Figure 18a, the metal at the marginal edge of the neck is now given a slight, initial or partial outward curl, as shown at 137 in Figures 18 and 18b. As shown in these figures, this curl is carried sufficiently to cause the edge to hem in a subsequent operation as shown in Figures 18b, 19, and 20. We prefer that in this partial curl the free edge of the metal be carried outwardly and downwardly to insure a proper folding and hemming thereof during the second or final curl.

The foregoing operations may be performed following the method and by means of apparatus of the character disclosed in our copending applications, Serial No. 129,068, filed March 4, 1937 and Serial No. 280,650 filed June 22, 1939. In such apparatus, the dies are formed so as to permit and cause the metal to flow during the drawing operation to progressively increase the gauge from the lip portion of the top to the bottom of the conical body thereof and from the closed end of the body to the open end thereof. As described in said applications, the operations are immediately successive and uninterrupted, except for the time required to transfer the blanks from one operation to another. The cup or container body is reduced in diameter and increased in length substantially uniformly throughout its circumference, so that relatively little trimming around the edges is necessary when the drawing has been completed. The top is drawn substantially in the manner above described in connection with Figures 45 to 48.

Thereafter, with respect to the top, as shown in Figures 18 to 20, the metal of the neck wall 116 above the inwardly inclined wall 28 and provided with the pre-curl 137 is curled outwardly and inwardly to a partially curled bead, as shown at 143 in Figures 18b and 19. In this operation, the pre-curl 137 is formed into a hem 31 and aids in preventing splitting or cracking during the curling. The operation of forming the pre-curl and the hem is illustrated in Figure 18b wherein a curling die 144 is diagrammatically illustrated. This figure shows the successive steps in the hemmed edge formation as the curling die bends the pre-curled edge 137 and wall 116 outwardly, downwardly, and inwardly in progressing toward the making of the hem and second curl as shown in Figure 19. Figure 18b also illustrates the intermediate stages in the formation of the curl shown in Figure 19 and as will be observed, the edge is completely hemmed before the second curl illustrated in Figure 19 is well under way. This formation of the hem substantially before the curling is well under way, as shown in Figure 18b, serves to prevent splitting of the edge during the severe working of the metal which occurs during the latter stages of the formation of the second curl illustrated in Figure 19. As explained above, the curling operation of Figure 18b continues until the edge is completely curled, the dotted lines, Figure 18b, showing the progress of the hem and bead formation. It is not necessary, of course, to form the hem in the curling operation; that is, the hem might be curled as an independent step prior to the initial curling. Thereafter, the curl is closed by axially pressing the same toward the inclined wall 38 and a hollow bead having a flat sealing surface 34 is formed, as above described. As will be observed, the sealing bead is curved to form not only a sealing surface 34, but a locking shoulder 32, as shown in Figures 2, 3, and 20. The curvature of this bead is such as to provide sufficient resiliency to resist the thrust upon application of a crown cap. This is likewise true, although not to the same extent, of the curvature embodied in the sealing lip illustrated in Figure 14. The resultant top and cap receiving finish by either method described are devoid of seams.

The parts produced by the steps just described are assembled as shown in Figure 1 with the conical portion 23 engaging over, i. e., overlapping the rim 20 in interfitting engagement therewith, and the two parts are soldered, welded, or otherwise joined along a single peripheral line as shown at 24 to form a container in which the inner and outer surfaces are substantially continuous. Interiorly, it is to be noted that the container is smooth and substantially free of obstructions both at the joint between the top and body, and at the mouth of the pouring opening 26.

This application is a continuation-in-part of our copending applications Serial Nos. 88,866 and 58,746.

We claim:

1. A metal container having a top devoid of seams, said top having a body portion which from its lower edge extends upwardly continuously in the form of a cone and an integral cylindrical neck extending thereabove and terminating in a cap receiving portion, and a cylindrical body devoid of side seams, the upper edge of said cylindrical body being inclined inwardly to form a conical rim extending continuously upwardly from the cylindrical body portion and at substantially the same angle as the cone portion of said top, said conical top portion interfitting the inwardly inclined rim of the body in overlapped relation with the top portion entirely supported by the rim and smoothly overlying the latter, and with the lower edge of the conical body portion of the top terminating above the cylindrical body and within the projection of the outer cylindrical surface of the body, whereby said edge does not project outwardly beyond the cylindrical body, said top and body being united at the overlapped joint formed by said interfitting conical portions.

2. The method of making a metal container which comprises drawing a top devoid of side seams and having a body portion which from its lower edge extends upwardly continuously in the form of a cone terminating in an integral cylindrical neck extending thereabove, which in turn terminates in an integral cap receiving portion, drawing a cylindrical body devoid of side seams and of greater diameter than the diameter of the conical portion of the top at the lower edge thereof, bending inwardly the upper edge of said cylindrical body to form the edge into an inturned conical rim inclining inwardly and upwardly at substantially the same angle as the conical portion of the top and in a single continuous angle from the cylindrical body to its free edge, interfitting said conical top portion and the inturned rim of the body, with the top portion supported entirely by the inturned rim and overlying the latter, and the lower edge of the conical top portion terminating above the cylindrical portion of the body and within the projection of the outer cylindrical surface of the body, and uniting the top and body at the overlapped joint formed by said interfitting conical portions whereby said lower edge of the top does not project outwardly beyond the cylindrical body.

AMOS CALLESON.
EDGAR A. CALLESON.